June 14, 1966 F. A. BROOKS 3,255,632
SINGLE-HEMISPHERE, WHOLE-SPECTRUM RADIOMETER
Filed Aug. 27, 1962 2 Sheets-Sheet 1
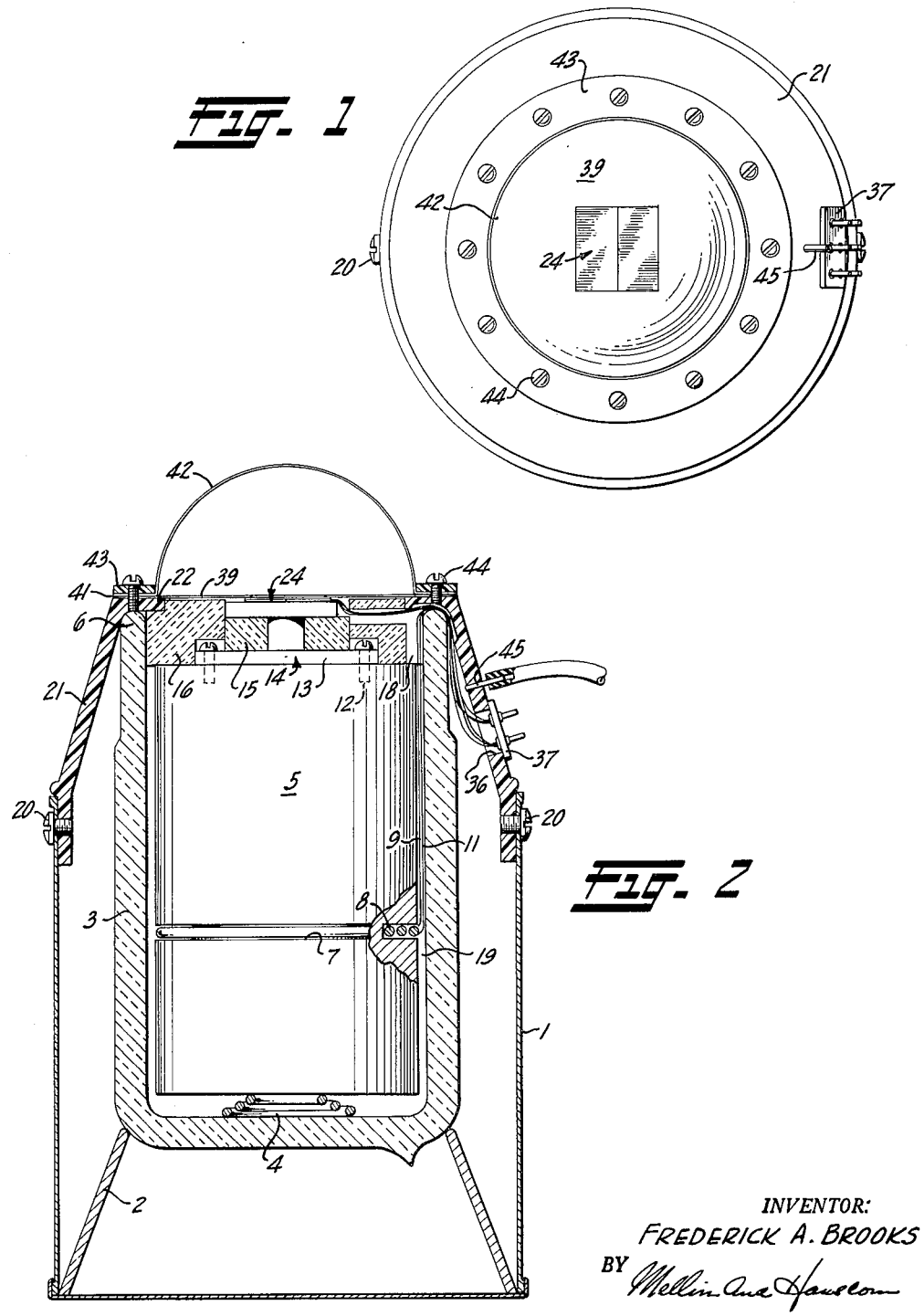
INVENTOR:
FREDERICK A. BROOKS
BY
ATTORNEYS

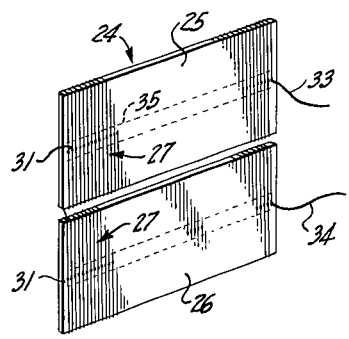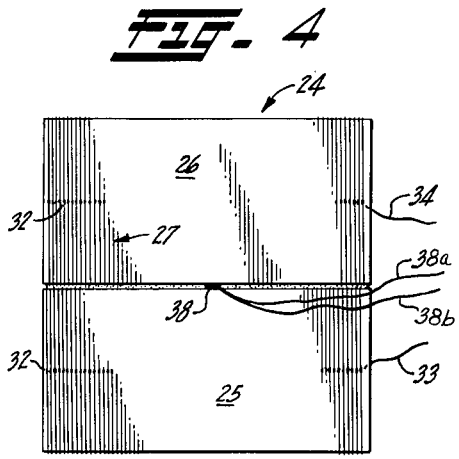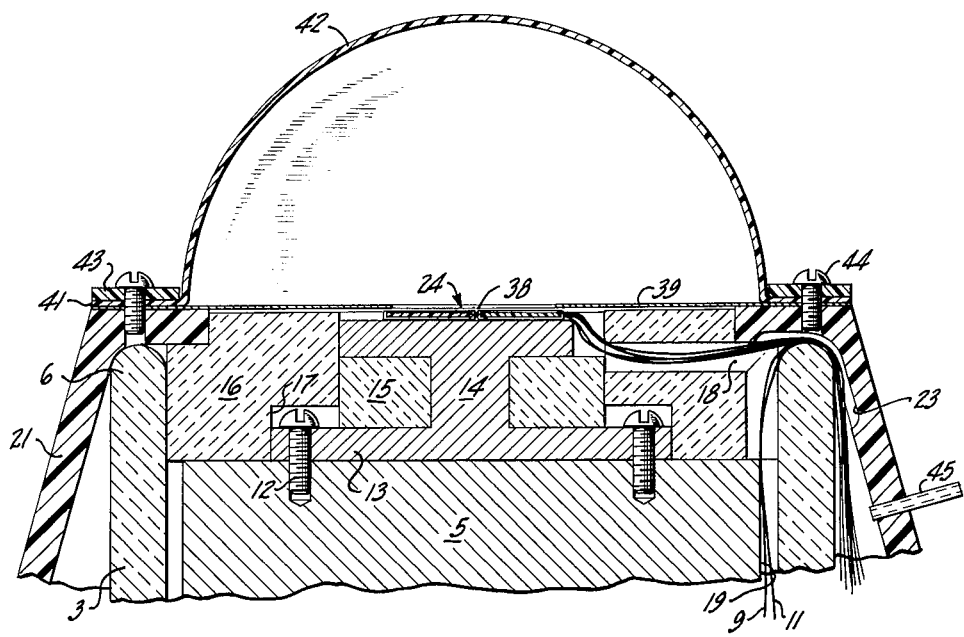

United States Patent Office 3,255,632
Patented June 14, 1966

3,255,632
SINGLE-HEMISPHERE, WHOLE-SPECTRUM
RADIOMETER
Frederick A. Brooks, Davis, Calif., assignor to The Regents of the University of California, Berkeley, Calif.
Filed Aug. 27, 1962, Ser. No. 219,701
8 Claims. (Cl. 73—355)

This invention relates to and in general has for its object the provision of a radiometer for reliably measuring the radiation part of the energy balance at a known surface.

More specifically, one of the objects of this invention is the provision of a radiometer including a heat sink; a flat, horizontally disposed thermopile coil mounted on said heat sink in heat transfer relationship therewith, the upper strands of said coil being blackened to serve as a radiation receiver section; a thermocouple associated with the receiver for measuring the temperature thereof; and a heat transducer recessed in the heat sink and serving as a means for heating or cooling the heat sink or for sensing the temperature of the heat sink.

Another object of this invention is the provision of a totally enclosed radiometer of the character above described, including a transparent shielding dome covering the thermopile and provided with means for subjecting the instrument to a slight internal air pressure so as to maintain dry air over the receiver and to keep the shielding dome free of irregularities.

The invention possesses other advantageous features, some of which, with the foregoing, will be set forth at length in the following description where that form of the invention which has been selected for illustration in the drawings accompanying and forming a part of the present specification is outlined in full. In said drawings, one form of the invention is shown, but it is to be understood that it is not limited to such form, since the invention as set forth in the claims may be embodied in other forms.

Referring to the drawings:

FIG. 1 is a top plan of a radiometer embodying the object of my invention.

FIG. 2 is a vertical midsection of the radiometer shown in FIG. 1.

FIG. 3 is an exploded perspective view of the thermopile unit.

FIG. 4 is a bottom plan view of the thermopile shown in FIG. 3.

FIG. 5 is an enlarged fragmentary vertical midsection of the upper end of the radiometer shown in FIGS. 1 and 2.

More specifically, the radiometer illustrated in these five figures includes a metal cylindrical can 1, such as is normally used for supporting Dewar flasks. Mounted within the can 1 is a supporting member 2, and seated thereon is a conventional Dewar flask 3.

Seated on the bottom of the flask 3 is a shock-absorbing compression spring 4, and mounted thereon is a cylindrical copper heat sink 5 terminating at its upper and somewhat short of the lip 6 of the Dewar flask. Formed intermediate the ends of the heat sink 5 is an annular groove 7, and accommodated therein is a heat exchanger, which can be in the form of a thermocouple coil 8. The thermocouple coil 8 can be used both to warm the heat sink 5 and to determine its temperature. Conveniently, if a small degree of cooling is wanted, this can be accomplished by the Peltier effect.

Conveniently, a Dewar flask having a 60 mm.-diameter mouth and a depth of 107 mm. can be here used, and the diameter of the heat sink 5 should then be sufficiently smaller than the diameter of the flask to permit the leads 9 and 11 to be accommodated between these two members.

Fastened to the top of the heat sink 5 coaxially therewith, by screws 12, is the foot 13 of an upstanding spool-shaped pedestal 14. Surrounding the pedestal 14 is a molded thermal insulating ring 15, preferably made of polyurethane foam. Sealed over the ring 15 and to the lip 6 of the flask is a second molded polyurethane ring 16 undercut as at 17 to accommodate the periphery of the foot 13 and provided with an L-shaped passageway 18 for establishing communication between the passageway 19 defined by the outer side walls of the heat sink and the inner side walls of the flask 3, and the cylindrical recess formed above the ring 15.

Fastened to the upper periphery of the can 1 by screws 20 is a plastic conical can extension 21 terminating at its upper end in a stepped flange 22 overlaying the stepped top of the ring 16 and having sealing engagement therewith. Formed in the corner of the flange 22 is a recess or passageway 23 through which electrical leads, to be presently described, can be threaded.

Seated on the pedestal 14 and cemented thereto by any suitable electrical insulating cement is the radiometer thermopile or receiver generally designated by the reference numeral 24.

The thermopile 24 includes a pair of identical rectangular plates 25 and 26 made of a thermal resistant material such as a phenol condensation product. For purposes of illustration, each of these plates can be 1 cm. x 2 cm. x 1/64" so that when placed side by side they will together form a square structure 1/64" thick. Wound on each of the plates 25 and 26 is a coil 27 of wire made up of constantan wire plated with silver for approximately half of each turn to form the opposed hot and cold junctions 31 and 32, respectively, of the thermopile. The two wound plates 25 and 26 are cemented together along their long edges by an insulating cement serving to electrically insulate the two coils from each other. The respective coils of the two units are connected in series with their leads 33 and 34 extending from one end of the completed unit. By constructing the thermopile 24 of two rectangular units, it can be made to contain twice the number of junctions which would otherwise be possible.

Coated over the hot junctions 31 is a film of black paint 35 serving as a radiation receiver or, in the alternative, a square section of blackened aluminum foil can be placed over the upper face of the thermopile unit.

The thermopile 24 as so constructed is cemented to the upper face of the pedestal 14 by an insulating cement with its cold junctions on the lower side of the thermopile.

The leads 33 and 34 of the thermopile 24 pass through the passageways 18 and 23 and through a hole 36 formed in the can extension, and then connect with a conventional terminal block 37. The terminals of the leads for the thermopile 24 can then be connected with a galvanometer or potentiometer if and when it is desired to measure the heat flux rate through the blackened thermopile receiver of the thermopile 24.

Mounted between the two thermopile plates 25 and 26 is a secondary temperature transducer or thermocouple 38 provided with leads 38a and 38b which, like the leads 33 and 34 of the thermopile 24, pass through the passageways 18 and 23 and connect with the terminal block 37. The temperature transducer 38 functions to determine the temperature of the thermopile 24, supplementing the primary function of the latter, which is to measure the heat flux rate through the blackened thermopile receiver of the radiometer. In short, this expedient makes it possible to measure the heat flux rate through the receiver at a known temperature.

Mounted over the flange 22 of the can extension 21 is a circular foil reflector 39 provided with a central window circumscribing the thermopile 24, and which serves as a radiation shield for shielding the insulating ring 16 against radiation.

Seated over the periphery of the reflector 39 is the flange 41 of a plastic hemispherical shielding dome 42. Mounted over the flange of the dome is a sealing and retaining ring 43 secured to the flange 22 by screws 44.

Mounted in the can extension 21 is a tube 45 by which the interior of the can, and particularly the dome 42, can be subjected to a slight pressure of dry air or nitrogen in the order of ¼″ of water so as to maintain the receiver space free of moisture and the dome free of irregularities.

The heat sink 5, being of a relatively large mass, serves to quickly conduct the heat flux measured by the thermopile 24, and thus minimize the rate of change of temperature in the thermopile. In order to maintain the instrument at a temperature above the dew point and thereby avoid fogging of the dome 42, the coil 8 can, when necessary, be used as a heating element. Here it should be noted that the instrument can be operated at any temperature so long as its receiver temperature is known.

Although there is nothing critical concerning the dimensions of any of the elements above numerated, a flask of the dimensions above enumerated with a thermopile 24 having an exposed coil winding surface in the order of 2 cm. x 2 cm. has proven to be very satisfactory.

From the above description it will be seen that I have provided a radiometer wherein the heat flux rate can be measured at a known temperature; wherein the receiver of the device is covered by a transparent dome to protect it against air currents; wherein provision is made for maintaining the dome under a slight pressure of a dry gas; and wherein provision is made for maintaining the atmosphere within the dome at a temperature above the dew point.

I claim:
1. A radiometer comprising a heat sink, a blackened radiation receiving surface, means for forming a heat transfer path from said blackened radiation receiving surface to said heat sink, said means comprising a thermopile mounted on said heat sink with one set of junctions in direct heat exchange therewith and the other set in direct heat exchange with said blackened radiation receiving surface, thus sensing the heat flow between said heat sink and said blackened radiation receiving surface, and additional means for sensing the temperature of said thermopile.

2. A radiometer as set forth in claim 1 and further including means surrounding said heat sink to thermally insulate said heat sink while exposing said blackened surface of said thermopile to the reception of radiation.

3. A radiometer as set forth in claim 2 and further including a transparent hemispherical dome mounted over said thermopile.

4. A radiometer as set forth in claim 3 and further including means for subjecting the interior of said dome to a pressure of dry gas sufficient to prevent distortion in the surface of said dome.

5. A radiometer comprising a high thermal capacity heat sink, a low thermal capacity thermopile having opposed faces and comprising a plurality of flattened coils, each of said coils having a hot junction on one face of said thermopile and a cold junction on the opposite face of said thermopile, one face of said thermopile being mounted on said heat sink in direct heat exchange relation thereto, the other face of said thermopile having a blackened radiation receiving surface, said coil forming a heat flow path between said radiation receiving surface and said heat sink, and additional means for sensing the temperature of said thermopile.

6. A thermopile as set forth in claim 5 and further including means surrounding said heat sink to thermally insulate said heat sink while exposing the blackened surface of said thermopile to the reception of radiation.

7. A radiometer as set forth in claim 6 and further including a transparent hemispherical dome mounted over said thermopile.

8. A radiometer as set forth in claim 7 and further including means for subjecting the interior of said dome to a pressure of dry gas sufficient to prevent distortion in the surface of said dome.

References Cited by the Examiner
UNITED STATES PATENTS

| | | |
|---|---|---|
| 2,666,089 | 1/1954 | Gier et al. |
| 2,768,527 | 10/1956 | Stern et al. _____ 73—355 X |
| 2,785,860 | 3/1957 | Harrison et al. _____ 73—355 X |
| 2,826,707 | 3/1958 | Bemus et al. _____ 250—83.3 X |
| 2,860,254 | 11/1958 | Hendee _____ 313—93 X |
| 3,030,810 | 4/1962 | Byrnes et al. _____ 73—355 |
| 3,080,755 | 3/1963 | Percy _____ 73—355 |
| 3,164,021 | 1/1965 | De Jong et al. _____ 73—355 |

LOUIS R. PRINCE, *Primary Examiner.*

ISAAC LISANN, *Examiner.*

STEVEN H. BAZERMAN, *Assistant Examiner.*